F. N. Gisborne.
Annunciator.
Nº 41,150.   Patented Jan. 5, 1864.
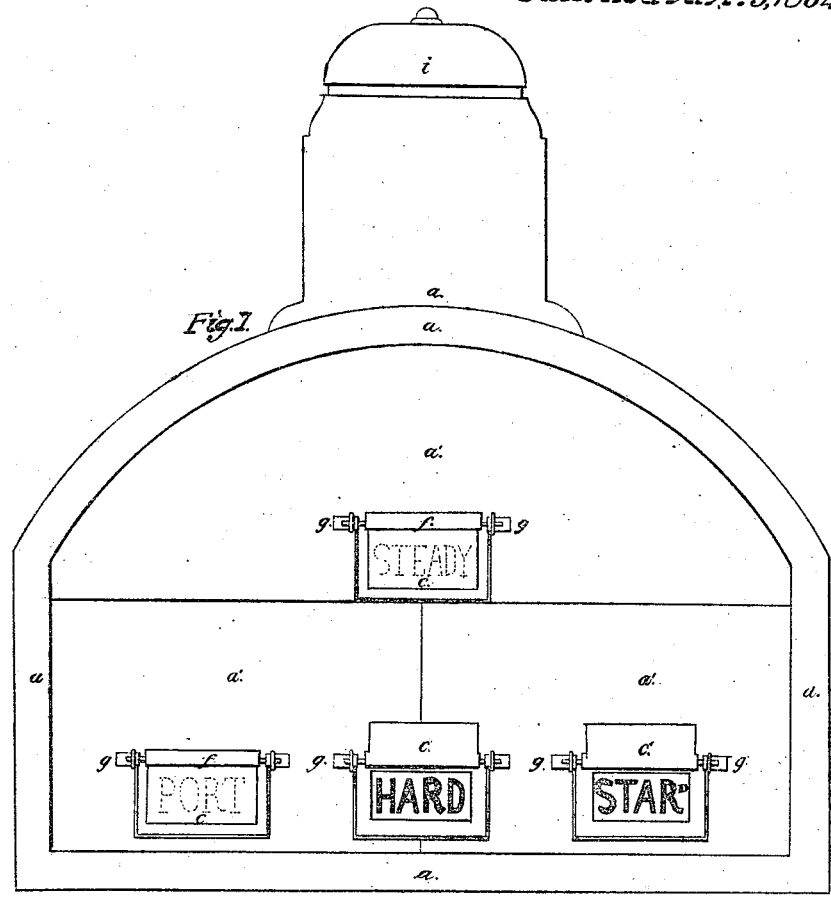
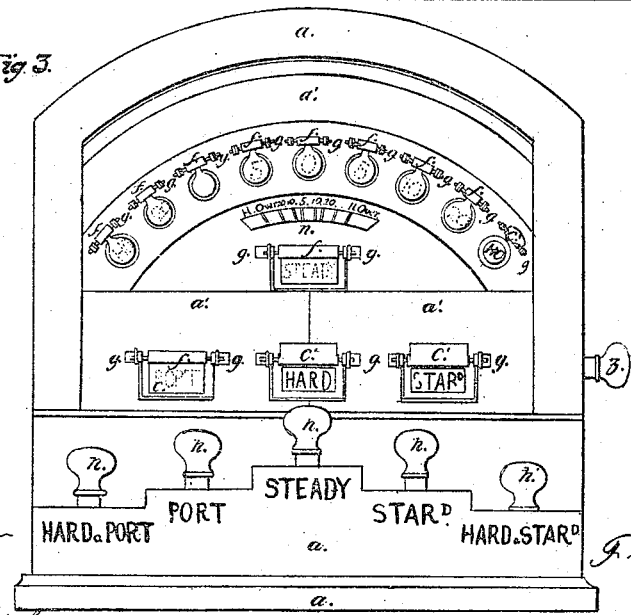

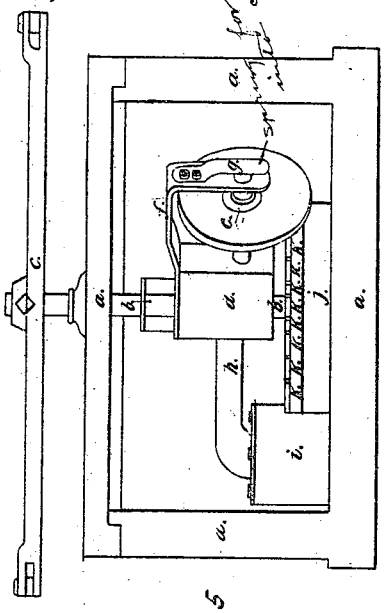
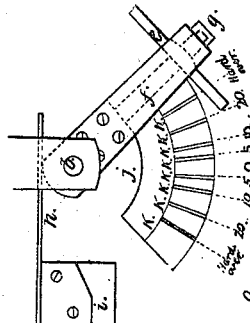
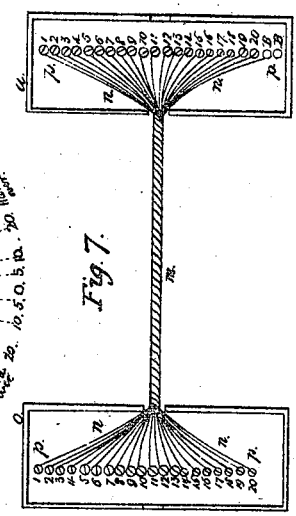
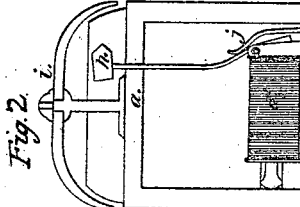
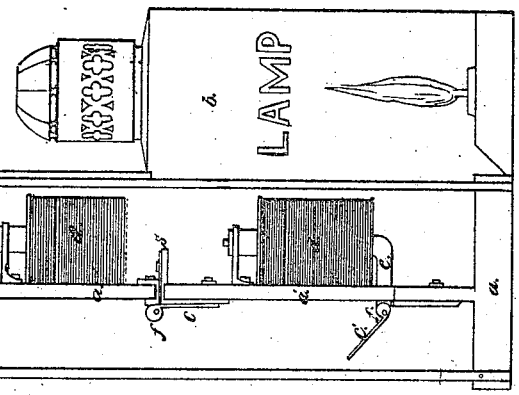
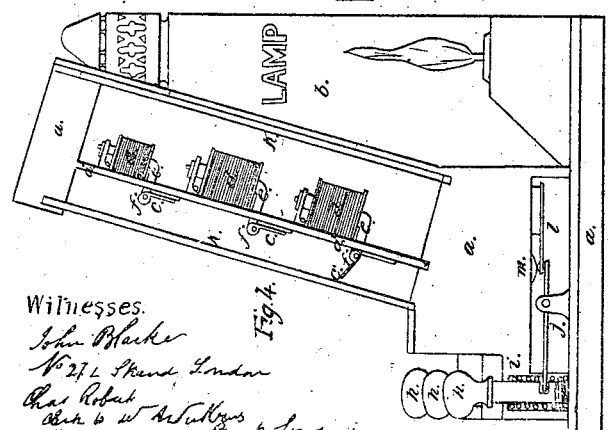
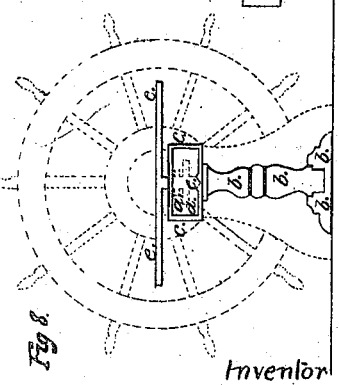

F. N. Gisborne.
Annunciator.
Nº 41,150.    Patented Jan. 5, 1864.
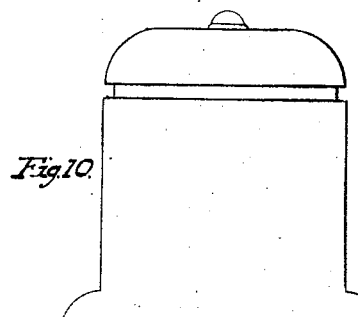
Fig. 10.
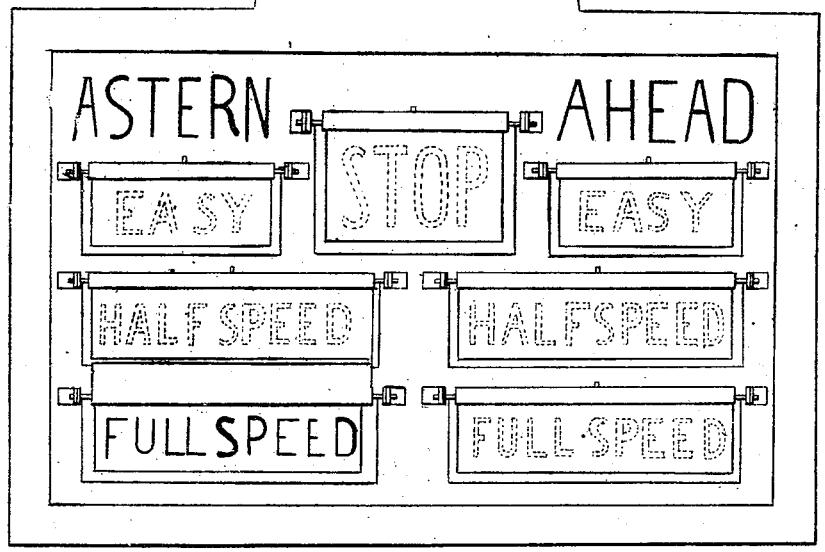
Fig. 12.
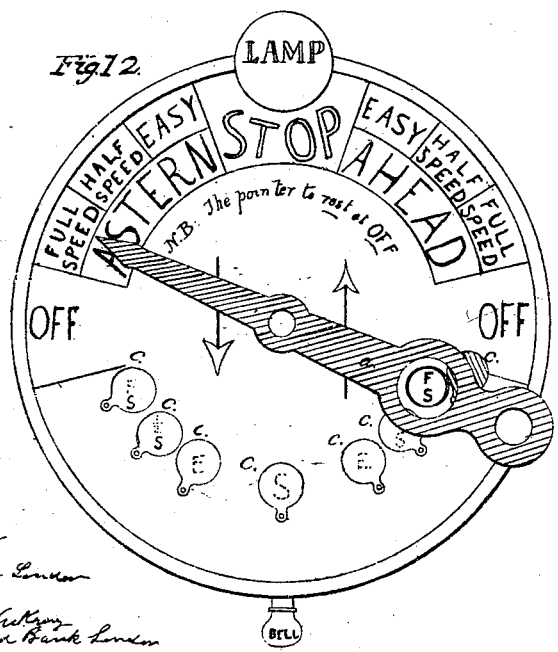

F. N. Gisborne.
Annunciator.
N° 41,150. Patented Jan. 5, 1864.
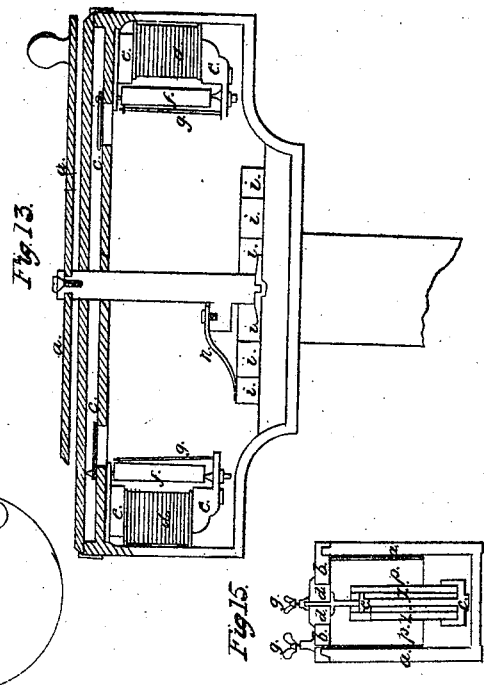
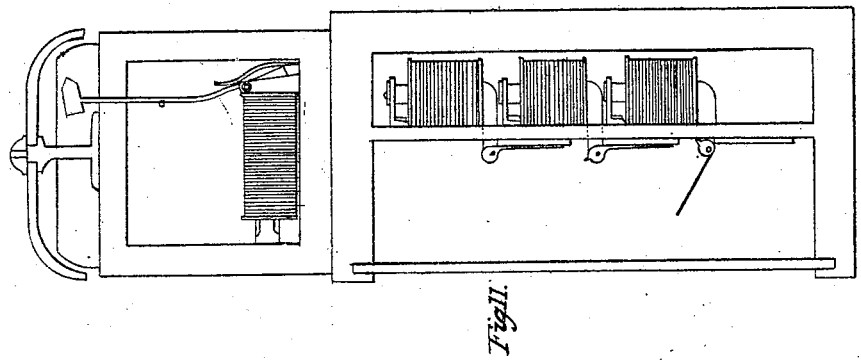

UNITED STATES PATENT OFFICE.

FREDERIC NEWTON GISBORNE, OF NO. 3 ADELAIDE PLACE, LONDON BRIDGE, LONDON, ENGLAND.

IMPROVEMENT IN STEERING-VESSELS.

Specification forming part of Letters Patent No. 41,150, dated January 5, 1864.

*To all whom it may concern:*

Be it known that I, FREDERIC NEWTON GISBORNE, of No. 3 Adelaide Place, London Bridge, in the city of London, England, engineer and electrician, have invented improvements in the means of an apparatus for indicating the course to be steered in ships at sea, and also of the change of the position of the rudder, and for transmitting signals on board ship, part of which improvements are applicable to other purposes; and I hereby declare that the following is a full and exact description thereof, reference being had to the accompanying drawings, and to the figures and letters marked thereon.

My invention consists of a novel arrangement of electrical apparatus whereby the lookout officer or other person may at any convenient part of the ship communicate to the helmsman the requisite orders as to the direction in which to steer the ship, and also whereby the helmsman on receiving such orders may reply thereto; also, of an arrangement whereby the rudder is made to indicate the alteration of its position; also, of the application of some of the above apparatus for other purposes.

In Sheet 1 of the drawings I have shown two views of the apparatus whereby the information as to the course to steer the ship may be communicated from the lookout officer to the helmsman.

Figure I is an external elevation, showing the front of the apparatus. Fig. II is a transverse vertical section of the same, showing the arrangement of the electro-magnets and some of the other parts connected therewith.

The apparatus shown in Figs. I and II consists of a box or case, *a a*, in which there are arranged two or more electric coils, *d d*, according to the number of different signals or words of command it may be desired to transmit to the helmsman. In the present instance the apparatus is intended to make the five signals or give the five words of command which are most usually required on board ship to instruct the helmsman the proper course to steer. These signals or words of command are the words "port," "hard-a-port," "starboard," "hard-a-starboard," and "steady." It will be observed that the word "hard" is common to the two orders of port and starboard, so that there are four flaps to answer for five signals.

The desired words are painted, marked, or otherwise shown upon pieces of colored or plain glass or other transparent or translucent substance, and are let into or placed over openings made in the slide or front, *a'*, of the box *a a*, and a lantern or lamp, *b*, having a strong light is placed at the back of the apparatus, as shown in Fig. II.

If desired, the above-mentioned words may be marked in different colored glasses, so that in case the helmsman cannot read he may understand the order given by the color indicating "port" or "starboard."

It will be understood that if a strong light be placed at night-time behind the box, as at *b*, Fig. II, it will show through the openings covered with glass. Each of these openings is provided with a shutter, lid, or cover, *c c*, to hide the light, except when the cover is drawn up, as shown at *c'* in Figs. I and II, and when that is done the green light with the word "starboard," and the white light with the word "hard" on the glasses will be distinctly visible to the helmsman as a direction for him to steer in the course indicated. The shutters, covers, or lids *c c* are worked by the electro-magnets *d d* by the means of the arrangement of armatures *f f*. These armatures *f f* are pivoted at *g g* to move eccentrically upon their axes when attracted by the poles *e e* of the electro-magnets *d d*, and the shutters *c c* are thereby raised to the position *c' c'* and expose the several orders painted upon the glasses behind them.

In order to attract the attention of the helmsman an audible signal may be made by striking a bell, *i i*, at the same instant that the shutters *c c* over one or more of the words of command are raised. This is effected by causing the same galvanic current which raises the shutters to pass through the electro-magnet *d'* and give a forward movement of the bell-hammer *h*, and the spring *j* returns the hammer to its dormant position.

The plate-glass front and back K and K' protect the instrument from injury during stormy weather.

The apparatus shown in Figs. III and IV will answer the triple purpose of sending the order to the helmsman, receiving back his reply, and noting the position of the helm or rudder as it changes its position.

First, the sending apparatus consists of five knobs or handles (marked $h\,h$) lettered "starboard," "port," &c., which, when pressed down, as in the the case $h'$, will cause the lever $j$ to bring the insulated spring $l$ in contact with the plate $m$, which in the instance noted is in electrical connection with the shutter $c'\,c'$ in Fig. I, and thus the result obtained. The spiral spring $i$ returns the knob to its dormant position when the pressure upon it is removed. In like manner all the knobs are in electrical contact with their respective shutters and the word "hard" is common to both outside knobs. The lookout officer or commander having given the necessary instructions to the helmsman as to the course to be steered, the latter will be required to signal in reply that he has received and understands the command. This he effects by pressing with his hip or knee against either end of the lever $e\,e\,e$, Fig. VIII, which has its bearings in the box $c\,c$ and is kept in position by elastic stuffing pressing against the flattened surface $a$. The movement of the lever causes the disk $d$, Fig. IX, to come in contact with the springs $h\,h$, (the springs being in common contact,) and completes the reply circuit.

Second, the receiving apparatus is constructed, but on a smaller scale, as Figs. I and II, the shutter $c\,c$, when up, in Figs. I and II connecting by their several springs, $s\,s$, Figs. II, one of the two breaks in the reply-circuits. The larger shutters, Figs. I and II, are, in fact, the manipulators for their corresponding shutters in Figs. III and IV as soon as the helmsman closes the return-circuit common to all shutters and springs. The helmsman to acknowledge the order sent has only to close the return-circuit common to the several magnets which raise the shutters on the bridge-instrument, Figs. III and IV, the springs $s\,s$, behind the shutters of the instrument, Figs. I and II, having already, as in the case $c'\,c'$, directed such current through the corresponding circuit in the bridge-instrument. In some cases in lieu of using the springs $s's$ in conjunction with the lever contact-maker, Figs. VIII and IX for the helmsman's reply, I use three or more pedals or buffers each closing a separate circuit through one or more of the magnets which raise the bridge-instrument.

Third, the apparatus for noting the movement of the helm, Figs. III and IV, consists of a number of smaller magnets and shutters acting as hereinbefore described; and in electrical circuit with the rudder apparatus, Figs. V and VI, an ivory or other scale, $n$, Fig. III, is lettered so as to correspond with the rudder-instrument contacts K K K K, Fig. VI, and the small shutters $f\,f\,f$, Fig. III. A battery being in circuit the lookout officer in order to ascertain at any moment the exact position of the helm has to close communication-circuit by pressing the side knob, Z.

In further explanation of the rudder apparatus, Figs. V and VI, it will be observed that the disk $e$, which revolves upon its axes between the block of ebonite $d$ or other suitable material and the support $f$, is pressed by the spring $g$ against the segment-contacts K K K, which are insulated from each other upon the piece of ebonite $f$. The disk $e$ is therefore always in contact with the one or other of the segments K K, and as the arms $c\,c$ (which are connected with the rudder-head) cause a corresponding movement in the shaft $b$, the disk moves in unison with the rudder-head. The spring $h$ being the common terminal for the return-circuit, and there being a distinct conductor between each segment and its corresponding shutter, and the only break in such return-circuit being at the knob Z, Fig. III, it is evident that the officer can at any moment observe the position of the rudder and its movements by simply closing the break-knob Z.

Fig. VIII shows the manner of connecting up the several electrical conductors.

$o'\,p\,o\,p$ are two small boxes placed between decks or in the hold of a ship, one convenient to the lookout-officer's station, and the other to the helm. The cable $m$ is then fastened under the deck-beams or to the skin of the ship, and the several conductors $n\,n$ which it contains brought to their respective screw-terminals 1 2 3 4, &c.

The terminals B B are extra for battery purposes. Each conductor in the cable is composed of a strand of seven insulated wires.

In further explanation of Figs. VIII and IX the standard C C supports the smaller box $c\,c$, in which the T-lever $e\,e$ has its bearings. A pressure from the helmsman at either end of the lever causes the projection upon the disk $d$ to come into contact with either end of the spring $h\,h$, and thus complete the return-circuit through any one or more of the reply-shutters, Fig. III.

The drawings, X and XI, show the adaptation of the foregoing apparatus, herein described, to engine-room signals with the following variation, which variation is also applicable to the steering-signals—viz., in lieu of the captain transmitting signals by pressure upon a particular knob, as in Fig. III, he, as in Fig. XII, moves the pointer A A to the order required, which orders, for the purpose of illumination at night, are painted upon enameled glass. This movement of the pointer causes the corresponding flap upon the engineer's instrument, Fig. X, to remain up until the engineer replies by moving a similar pointer, Fig. XIV, which again causes the shutter $c$, Fig. XII, to move sidewise, thus uncovering the return-signal within and under the pointer $a\,a$. When the captain replaces the pointer at "Off" the flaps or shutters close.

The electro-mechanical movement in Fig. XIII is similar to that which has been already described in Figs. I and X, excepting that the armatures $f\,f$ work upon a vertical instead of a horizontal axis toward the poles $e\,e$ of the electro-magnets $d\,d$, the springs $g\,g$ causing the armatures to return to their normal position when magnetic attraction ceases.

Attached to the axis of the pointer A A is a contact-spring, $h$, which presses upon a semicircle of sectional metals $i\ i$, such sectional metals being connected with the orders to the engineer in a similar manner to that described in Figs. V and VI.

The dial, Fig. XIV, is a simple contact-maker for the engineer's reply.

Fig. XV is the form of battery I prefer.

$a\ a$ is an earthenware or glass cell; $b\ b$, a gutta-percha cover having an aperture in the center and supporting the platinized silver plate $p\ p$. $d$ is a smaller gutta-percha cover which closes the aperture in the larger cover; and $e$, the standard which supports the cylinder of zinc $z$, the bottom of which rests in the cup $c$, containing mercury. $g\ g$ are the terminals.

Having now described my said invention, and the manner of carrying the same into effect, I make the following claims, viz :

1. The eccentric movement of the armature herein described, whereby I am enabled to uncover a large signal with a very trifling movement of the armature, and with a minimum magnetic power, consequent upon the armature being always in close proximity to the electro-magnet.

2. The application of a double break in each circuit, the one being completed by the slide or shutter when up, the other by the pressure of the helmsman upon his reply-lever, and thus by a single movement enabling him to repeat back many signals.

3. The application of a contact-maker to the rudder head or shaft of a vessel for the purposes herein described, and especially the revolving side-wheel rubbing contact-maker herein particularly described.

In witness whereof I, the said FREDERIC NEWTON GISBORNE, have hereunto set my hand this 20th day of June, in the year of our Lord 1863.

FREDERIC NEWTON GISBORNE.

In presence of—

ISAAC BOND,
12 *King's Bench Walk, Temple, London.*

CHAS. ROBERTS,
*Clerk to M. H. Wickens, 4 Tokenhouse Yard Bank, London.*